(12) United States Patent
Walter

(10) Patent No.: US 10,946,560 B2
(45) Date of Patent: Mar. 16, 2021

(54) REUSABLE COUNTERTOP MOLD

(71) Applicant: Gregory Walter, Minooka, IL (US)

(72) Inventor: Gregory Walter, Minooka, IL (US)

( * ) Notice: Subject to any disclaimer, the term of this patent is extended or adjusted under 35 U.S.C. 154(b) by 322 days.

(21) Appl. No.: 15/971,746

(22) Filed: May 4, 2018

(65) Prior Publication Data

US 2019/0337196 A1 Nov. 7, 2019

(51) Int. Cl.
| | | |
|---|---|---|
| *B29C 39/34* | (2006.01) | |
| *B29C 33/14* | (2006.01) | |
| *B29C 33/48* | (2006.01) | |
| *B29C 33/30* | (2006.01) | |
| *B29L 31/44* | (2006.01) | |

(52) U.S. Cl.
CPC .............. *B29C 39/34* (2013.01); *B29C 33/14* (2013.01); *B29C 33/305* (2013.01); *B29C 33/48* (2013.01); *B29L 2031/441* (2013.01)

(58) Field of Classification Search
CPC ......... B29C 39/34; B29C 33/14; B29C 33/48; B29C 33/305; B29C 39/10; B29C 33/005; B29C 39/26; B29L 2031/441; B29K 2715/003; B29D 99/0039; A47B 2200/001; B28B 7/0014
USPC ...................................................... 249/187.1
See application file for complete search history.

(56) References Cited

U.S. PATENT DOCUMENTS

| | | | | |
|---|---|---|---|---|
| 3,373,233 A | * | 3/1968 | Rondum | B29C 53/063 |
| | | | | 264/462 |
| 4,574,017 A | * | 3/1986 | Stegmeier | E04H 4/141 |
| | | | | 156/247 |
| 4,625,343 A | * | 12/1986 | Bumgarner, Sr. ....... | E04H 4/141 |
| | | | | 249/DIG. 3 |
| 5,009,047 A | * | 4/1991 | Olding | E04G 13/06 |
| | | | | 52/218 |
| 5,170,517 A | * | 12/1992 | Stegmeier | E04H 4/14 |
| | | | | 4/496 |
| 5,766,500 A | * | 6/1998 | Bordener | A47B 96/18 |
| | | | | 249/117 |

(Continued)

FOREIGN PATENT DOCUMENTS

WO WO-2017223171 A1 * 12/2017 ......... B29C 33/0011

*Primary Examiner* — Leith S Shafi
(74) *Attorney, Agent, or Firm* — Donald Flaynik

(57) ABSTRACT

A reusable countertop mold in accordance with the present invention includes at least one mold sheet, but generally a plurality of mold sheets are required to extend about a predetermined portion of a periphery of a floor mounted cabinet. The mold sheet is dimensioned and configured to ultimately form a countertop having a predetermined configuration with predetermined dimensions. The mold sheet includes a relatively thin base portion and a wall portion perpendicular to the base portion. The reusable countertop mold further includes a plurality of fastener recesses in an inner side portion of the base portion, the recesses ultimately allowing fasteners to pass through a countertop substrate and into the floor mounted cabinet, after the base portion has been inserted between the countertop substrate and the cabinet. After a countertop forming material has hardened upon the countertop substrate and the mold sheet, the base portion of the mold sheet is slidably removed from between the countertop substrate and the cabinet, thereby allowing the reusable countertop mold to be reused for another countertop forming project.

6 Claims, 9 Drawing Sheets

(56) References Cited

U.S. PATENT DOCUMENTS

| | | | | |
|---|---|---|---|---|
| 5,906,875 A | * | 5/1999 | Bordener | A47B 96/18 |
| | | | | 249/117 |
| 6,243,935 B1 | * | 6/2001 | Olson | A47B 77/022 |
| | | | | 249/177 |
| 7,219,409 B2 | * | 5/2007 | Jecker | A47B 77/022 |
| | | | | 29/402.01 |
| 7,861,471 B2 | * | 1/2011 | Smith | E04H 4/142 |
| | | | | 52/169.7 |
| 2008/0061213 A1 | * | 3/2008 | Garceau | E04G 9/10 |
| | | | | 249/18 |
| 2013/0082160 A1 | * | 4/2013 | Hsiao | E04G 13/068 |
| | | | | 249/189 |

\* cited by examiner

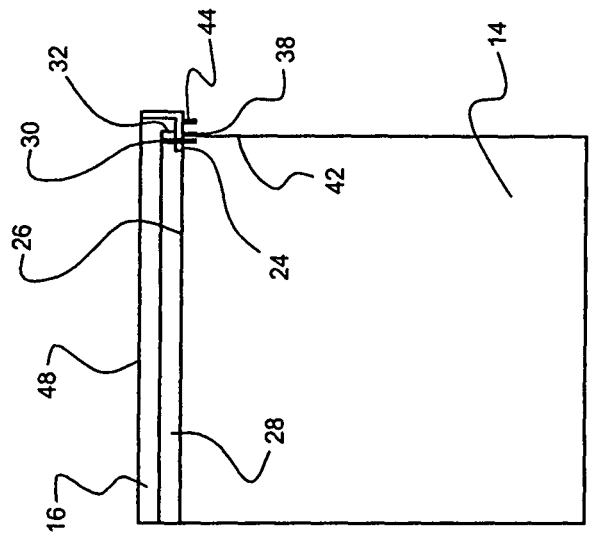
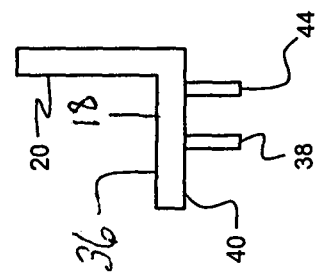
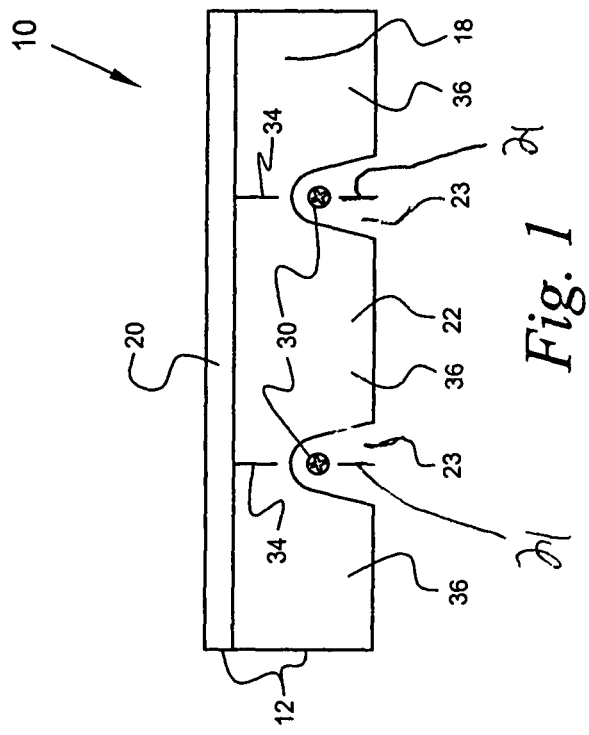
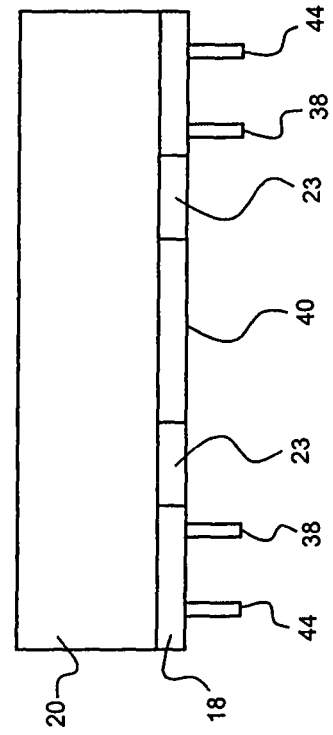
Fig. 4
Fig. 3
Fig. 1
Fig. 2

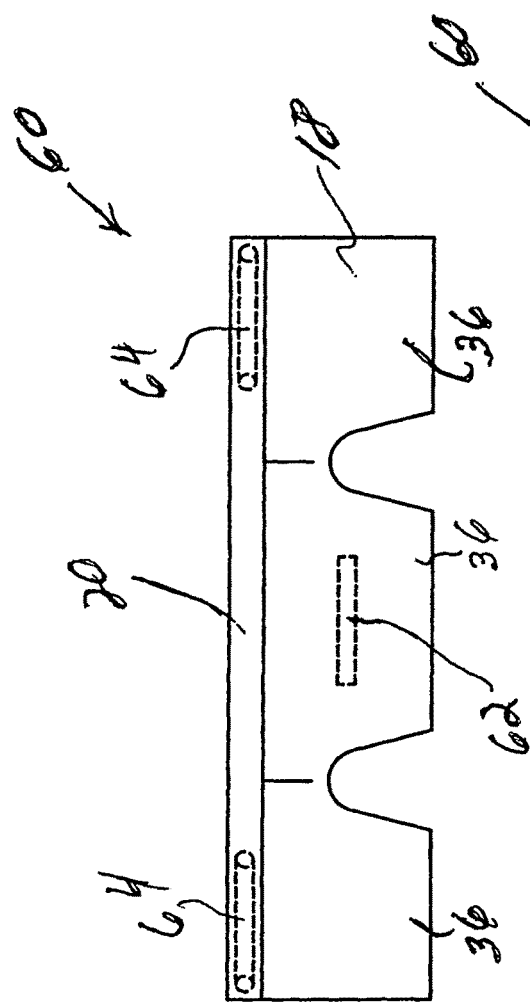
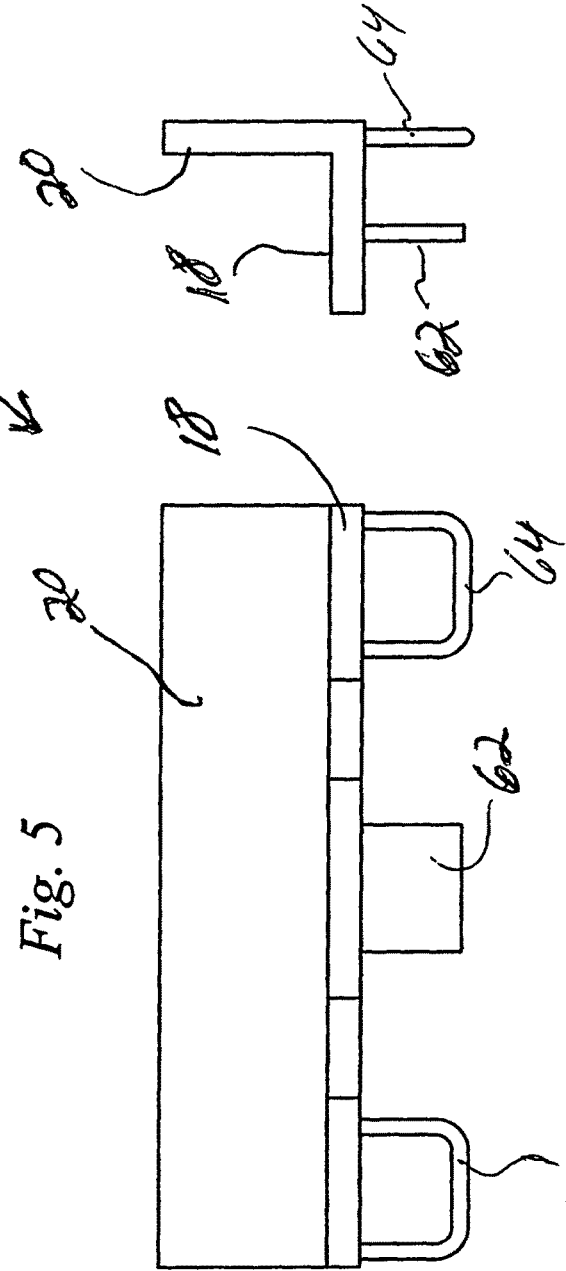
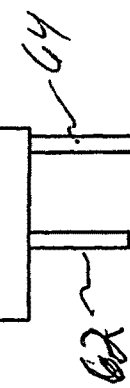

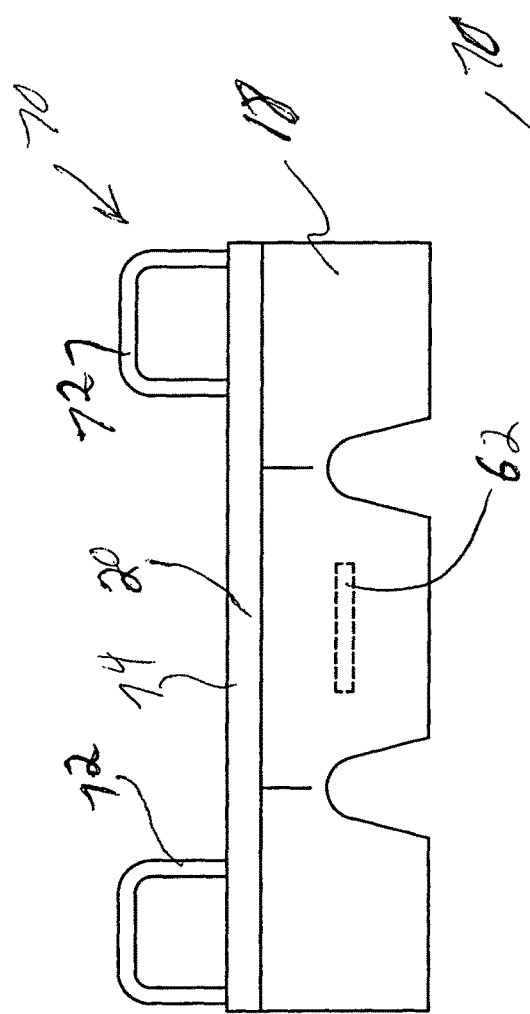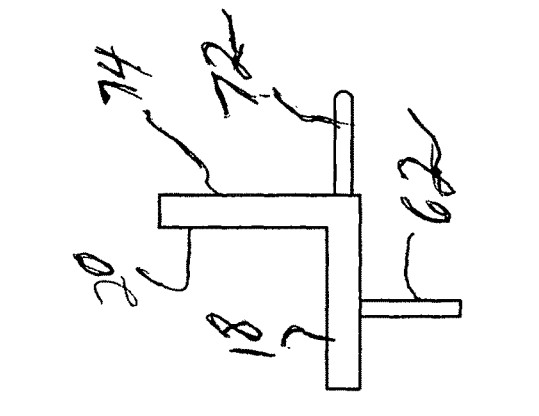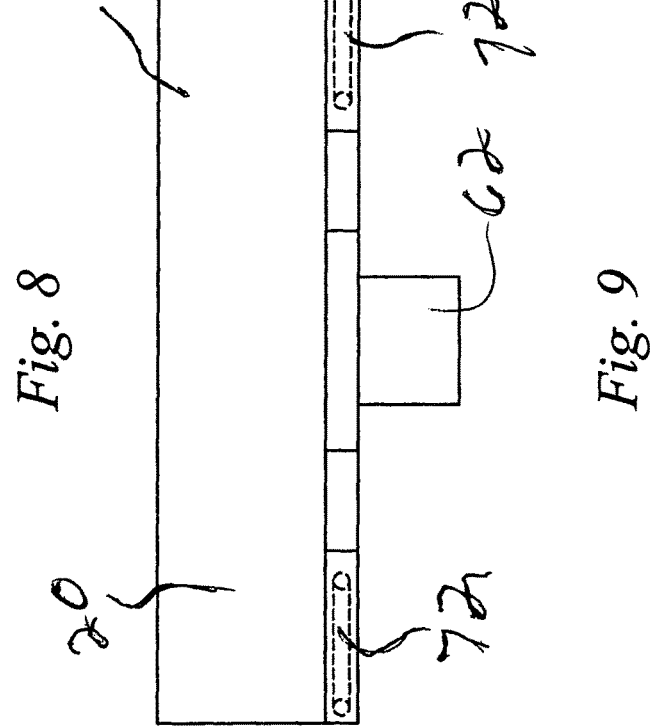
Fig. 8
Fig. 9
Fig. 10

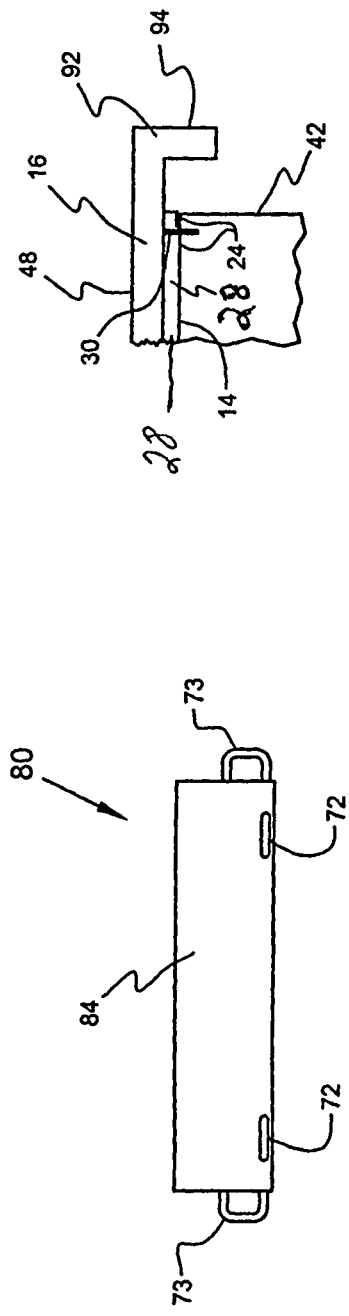
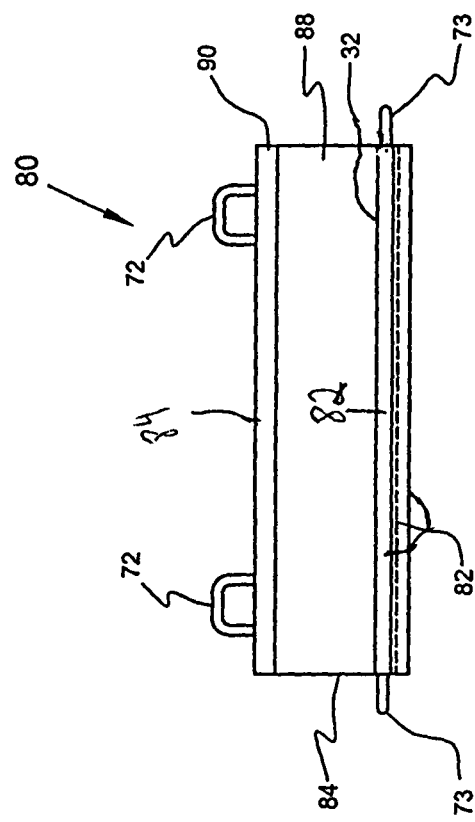

REUSABLE COUNTERTOP MOLD

BACKGROUND OF THE INVENTION

1. Field of the Invention

This invention relates to countertop molds for forming top and edge portions of countertops fabricated from a countertop forming material poured into a mold, and more particularly to a reusable countertop mold that can be removed from a hardened countertop without damaging the countertop, thereby allowing the mold to be used at another job site.

2. Background of the Prior Art

Mold assemblies for forming edge portions of custom countertops when pouring a countertop forming material into a recess formed by a countertop substrate and a mold assembly are well known. In particular, U.S. Pat. No. 7,001,558 ("558") provides a mold for producing a finished countertop on top of a countertop substrate having a top and an edge. The mold assembly of the 558 patent includes a configured inner surface portion that that receives a countertop forming material. The 558 mold assembly further includes a tab portion extending from the configured inner surface portion, the tab portion dimensioned to extend sufficiently to cover an edge portion and top portion of the countertop substrate edge, thereby positioning the inner surface of the mold assembly adjacent to the countertop substrate edge to ultimately form a countertop edge after a countertop forming material, engaging the mold assembly, sets or otherwise hardens. After the countertop forming material hardens, the configured inner surface portion is separated from the tab portion, which remains in place between the poured countertop and the countertop substrate.

The problem with the 558 patent is that the mold assembly cannot be reused with the same method described in the patent. More specifically, once the inner surface portion is cut, sawed or otherwise separated from the tab portion, there is no tab portion to extend over the substrate top and edge to hold the inner surface portion adjacent to the countertop substrate edge. In the event that the inner surface portion of the mold assembly includes decorative designs or configurations that result in a relatively expensive mold assembly, once the inner surface portion is separated from the tab portion, the inner surface portion has only salvage value. A need exists for a reusable mold assembly for forming edge portions of countertops.

SUMMARY OF THE INVENTION

It is an object of the present invention to provide an improved countertop mold for forming a finished countertop on peripheral portions of a substrate that is secured to a floor mounted cabinet. A principal object of the present invention is to provide a reusable countertop mold that inserts between a countertop substrate and a peripheral portion of a floor mounted cabinet. A feature of the reusable countertop mold is a relatively thin and relatively rigid base portion. Another feature of the reusable countertop mold is a relatively rigid wall portion. An advantage of the base portion of the reusable countertop mold is that the base portion of one or more reusable countertop molds can be manually inserted between the countertop substrate and peripheral portion of the floor mounted cabinet after the substrate has been disposed upon the floor mounted cabinet. An advantage of the wall portion of the reusable countertop mold is that the wall portion can have a myriad of relatively expensive configurations that is capable of maintaining a predetermined quantity of countertop forming material that extends beyond the periphery of the floor mounted cabinet.

Another object of the present invention is to provide a reusable countertop mold that promotes the insertion of fasteners through the countertop substrate and into a top edge portion of the peripheral portion of the floor mounted cabinet. A feature of the reusable countertop mold is a plurality of recesses in the base portion of the reusable countertop mold. Another feature of the reusable countertop mold is the placement of indicator lines for marking the center line of the recesses. An advantage of the recesses with the centerline indicator lines is that the user of the invention is capable of identifying the center location of each recesses after the user has forcibly urged the base portion of the mold between the substrate and cabinet such that the recesses are not visible to the user; whereupon, the user can drive fasteners through the countertop substrate and into the top edge portion of the peripheral portion of the cabinet without engaging the base portion of the mold. Another advantage of the recesses is that the user is able to slidably remove the base portion of the mold from between the substrate and the cabinet after the countertop forming material has hardened without damaging the mold or the hardened countertop forming material, thereby enabling both the base and wall portions of the mold to be reused at another job site. Still another advantage of the base portion with the recesses is that after removing the base portion from between the substrate and cabinet, the resulting gap formed by the removal of the thin base portion includes a vertical dimension sufficiently small such that the edge portion of the formed countertop will not deform when relatively heavy forces are urged upon a surface of the edge portion.

Yet another object of the present invention is to provide a reusable countertop mold that includes a wall portion with a relatively elaborate and costly design that is ultimately formed into a peripheral portion of the countertop forming material after the material hardens. A feature of the reusable countertop mold is that the fabrication process for the mold enables the mold to maintain its configuration and design forming features when forcibly removed from its insertion position between the countertop substrate and the cabinet. An advantage of the mold is that relatively expensive designs can be formed upon a surface of the wall portion of the mold that are ultimately transferred upon a cooperating surface of the countertop forming material, and since the mold is reusable, the same designs can be impressed upon countertop forming material at another job site, thereby cost justifying the fabrication of the reusable countertop mold.

Still another object of the present invention is to prevent a user of the mold from forcibly inserting the mold between the countertop substrate and the cabinet a distance that does not meet specifications. A feature of the mold is a base portion that includes stopper members integrally joined to a bottom wall of the base portion. An advantage of the mold is that the stopper members engage a side wall portion of the floor mounted cabinet to prevent the user from forcibly inserting the base portion of the reusable countertop an excessive distance inward between the substrate and cabinet. Another advantage of the mold is that the stopper members provide the user a "measuring member" to avoid inserting the base portion of the mold a distance less than required to form the required countertop.

Another object of the present invention is to enable a user of the mold to extract the reusable mold from between the substrate and the cabinet without damaging the mold. A feature of the reusable countertop mold is one or more pullout tabs integrally joined to an outer wall of the base portion and/or an outer wall of the wall portion adjacent to the joining line of the base and wall portions of the mold. An advantage of the mold is that the pullout tabs are disposed to prevent damage to the base and wall portions when the required force is applied by the user when extracting the base portion of the mold from between the substrate and cabinet.

Another object of the present invention is to provide a reusable countertop mold that is adjustable such that the vertical elevation of the countertop above the countertop substrate is variable and capable of meeting a range of vertical specifications. A feature of the reusable countertop mold is the detachable joining of the wall portion with the base portion of the mold. Another feature of the mold is a vertically adjustable and detachable joining of the wall portion with the base portion of the mold. An advantage of the mold is that after the base portion is inserted between the substrate and the cabinet, the user can decide on a wall portion with a vertical dimension that results in a countertop mold vertical elevation or "thickness" that is best suited for the floor mounted cabinet. Another advantage of the mold is that after the base portion is inserted between the substrate and the cabinet, the user can exchange a wall portion with an initial design scheme for a wall portion having a different design scheme. Yet another advantage of the mold is that the initial joined position of the wall portion to the base portion can be changed such that the wall portion will produce a countertop edge portion having a higher or lower elevation above the countertop substrate.

Another object of the present invention is to provide a reusable countertop mold that enables the edge portion of a countertop to extend horizontally beyond a side wall portion of the floor mounted cabinet, and that enables the edge portion of a countertop to extend vertical lower than a top edge portion of the floor mounted cabinet. A feature of the reusable countertop mold is a cabinet portion having a horizontal portion that inserts between the substrate and cabinet a distance that does not engage the retaining screws, thereby eliminating the need for the recesses and allowing the reusable countertop mold to be pulled via vertical cabinet portion pullout tabs in a direction parallel to a side wall of the cabinet. Another feature of the reusable countertop mold is a countertop edge forming member fabricated from a relatively lightweight material such as polyurethane disposed adjacent to a vertical portion of the cabinet portion of the mold, the polyurethane having dimensions that result in a recess being formed between the polyurethane and a side wall portion of the mold. An advantage of the mold is that the recess between the polyurethane and the wall portion of the mold ultimately receives the countertop forming material, resulting in the countertop forming material hardened into an edge portion for the countertop that is horizontally offset from and vertically extending below the countertop substrate, thereby providing a more artistic countertop. Another advantage of the mold is that after removing the mold from the hardened countertop, the polyurethane can be left in place or forcibly removed in a generally downward direction from the countertop edge.

Another object of the present invention is to provide a modified reusable countertop mold that enables the edge portion of a countertop to extend horizontally beyond a side wall portion of the floor mounted cabinet, and that enables the edge portion of a countertop to extend vertical lower than a top edge portion of the floor mounted cabinet. Another object of the modified reusable countertop mold is that the mold is adjustable such that the vertical elevation of the countertop above the countertop substrate is variable and capable of meeting a range of vertical specifications. A feature of the modified reusable countertop is a countertop edge forming member fabricated from a relatively lightweight material such as polyurethane disposed adjacent to a vertical portion of a cabinet portion of the modified mold. Another feature of the modified reusable countertop mold is the detachable joining of a cabinet portion to a base portion of the modified mold. Another feature of the modified reusable countertop mold is the positioning of pullout tabs on vertical portions of a cabinet portion of the modified mold. An advantage of the modified mold is that the wall portion can be separated from the base portion after an edge portion of a countertop forming material hardens, thereby allowing the polyurethane structure to be forcibly removed vertically downward from the hardened countertop; whereupon, the cabinet portion pullout tabs and/or the base portion pullout tabs are used to horizontally extract the base portion from between the substrate and cabinet.

Another object of the present invention is to provide a countertop without mold overlap lines or "ghost lines" formed into the countertop via overlapped molds. A feature of the reusable countertop mold is a relatively thin base portion. Another feature of the mold is the formation of relatively thin ghost lines resulting from the overlap of relatively thin base portions. An advantage of the mold is that the resulting ghost lines are readily removed from the hardened countertop via standard mason grinding tools without damage to the countertop. Another advantage of the mold is that a relatively thin tape can be applied upon overlapped portions of adjacent mold base members, thereby preventing the formation of ghost lines and enabling the removal of the tape from the respective portion of the countertop.

BRIEF DESCRIPTION OF THE DRAWINGS

The foregoing invention and its advantages may be readily appreciated from the following detailed description of the preferred embodiment, when read in conjunction with the accompanying drawings in which:

FIG. 1 is a top view of a reusable counter top mold in accordance with the present invention.

FIG. 2 is a front view of mold in FIG. 1.

FIG. 3 is a side view of the mold in FIG. 1.

FIG. 4 is a side view of the mold in FIG. 3 inserted between a top edge portion of a cabinet and a bottom edge portion of a countertop substrate.

FIGS. 5-7 depict an alternative configuration for the mold depicted in FIGS. 1-4, the alternative configuration for the mold depicting stopper members and pullout tabs with different configurations and positions when compared to the same elements of FIGS. 1-4 in accordance with the present invention; FIG. 5 is a top view of the alternative configuration.

FIG. 6 is a front view of the alternative configuration of the mold in FIG. 5.

FIG. 7 is a side view of the alternative configuration of the mold in FIG. 5.

FIGS. 8-10 depict an alternative configuration for the mold depicted in FIGS. 5-7, the alternative configuration for FIGS. 8-10 has changed the location of the pull tabs of FIGS. 5-7 from a vertical position to a horizontal position in accordance with the present invention; FIG. 8 is a top view of the alternative configuration.

FIG. 9 is a front view of the mold of FIG. 8.

FIG. 10 is a side view of the mold of FIG. 8.

FIG. 13A is a front view of only the mold of FIG. 13.

FIG. 13B is the side view of FIG. 13, but with the reusable countertop mold removed and a resulting extended edge portion of a countertop depicted.

FIG. 13C is a top view of FIG. 13.

DESCRIPTION OF THE PREFERRED EMBODIMENT

Figure 11:
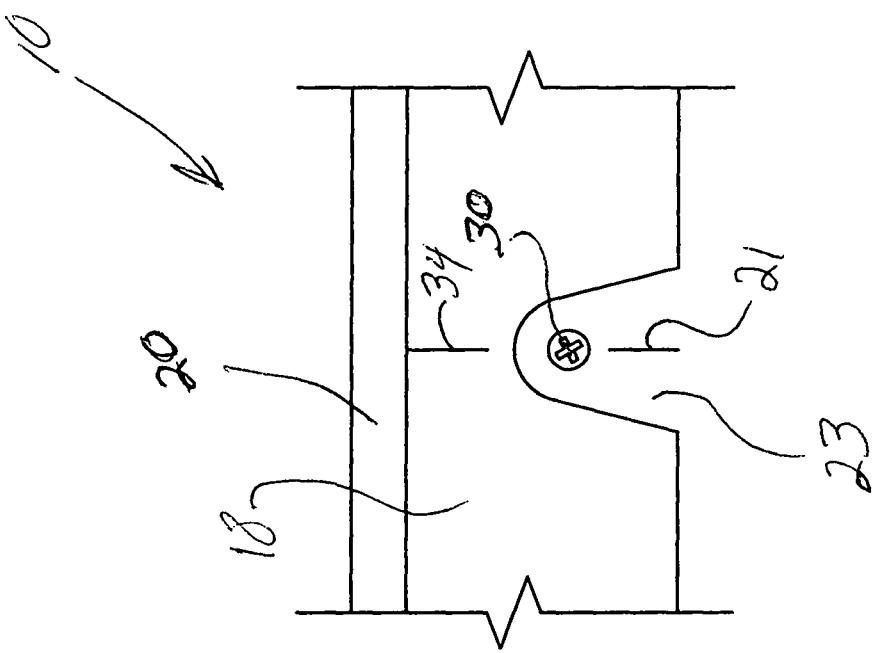
FIG. 11 is a top sectional view of the mold of FIG. 1 depicting a recess in the base portion.

Referring to FIGS. 1-4, a reusable countertop mold in accordance with the present invention is denoted as numeral 10. The reusable countertop mold 10 includes at least one relatively thin and relatively rigid mold sheet 12, but generally a plurality of mold sheets 12 are required to extend about a predetermined portion of the periphery of a floor mounted cabinet 14. The mold sheet 12 can be fabricated from a myriad a materials including but not limited to plastic, wood and metals with the preferred fabricating material being steel. The mold sheet 12 is dimensioned and configured to ultimately form a countertop 16 having a predetermined configuration with predetermined dimensions. The mold sheet 12 includes a relatively thin base portion 18 and a wall portion 20 perpendicular to the base portion 18. The base and wall portions 18 and 20 can be formed by bending the mold sheet 12 or integrally joining two mold sheets 12 at edge portions such that a ninety degree angle is formed. The reusable countertop mold 10 includes a plurality of fastener recesses 23 in an inner side portion 22 of the base portion 18. The recesses 23 are disposed at predetermined locations in the inner side portion 22. The relatively thin inner side portion 22 promotes a substantially horizontal insertion of the inner side portion 22 of the base portion 18 between a top edge portion 24 of the cabinet 14 and a bottom edge portion 26 of a countertop substrate 28.

The plurality of fastener recesses 23 disposed at predetermined locations in the inner side portion 22 of said base portion 18 of the mold sheet 12 promote the insertion of retaining screws 30 through the countertop substrate 28 and through the fastener recesses 23 in the base portion 18 of mold sheet 12, which has been inserted between the top edge portion 24 of the cabinet 14 and between the bottom edge portion 26 of the countertop substrate 28. The insertion of the retaining screws 30 continues through fastener recesses 23 and into the top edge portion 24 of the cabinet 14, without the retaining screws 30 engaging the mold sheet 12, thereby allowing the mold sheet 12 to be slidably removed from an inserted position between the bottom edge portion 26 of the countertop substrate 28 and the top edge portion 24 of the cabinet 14 after a countertop forming material 16 has been poured upon the countertop substrate 28. The countertop forming material 16 is retained upon the countertop substrate 18 by the base and wall portions 18 and 20 of the mold sheet 12 and by the fastener recesses 23 being covered by the countertop substrate 28 after the base portion 18 of the mold sheet 12 is manually inserted between the countertop substrate 28 and the cabinet 14. The periphery of the countertop substrate 28 ultimately receives a plurality of the mold sheets 28 such that a peripheral vertical wall is formed by a plurality of wall portions 20 about the periphery of the countertop substrate 28 to maintain the countertop forming material 16 upon the countertop substrate 28 and to extend the countertop forming material 16 a preselected distance past substantially vertical countertop substrate edge portions 32, thereby maintaining the countertop forming material 16 in a fixed position until hardening to form a predetermined countertop 16 configuration upon and about the edge portions 32 of the countertop substrate 28.

The reusable countertop mold 10 further includes guide lines 34 that identify centerlines 21 for each fastener recess 23, thereby identifying the insertion point for a retaining screw 30 to insert through a fastener recess 23 and through the countertop substrate 28 and into the cabinet 14 with the reusable countertop mold 10 inserted between the countertop substrate 28 and the cabinet 14, such that the fastener recesses 23 are not visible to the user. The fastener recesses 23 are dimensioned to allow the retaining screws 30 to avoid engagement with the mold sheets 12. Further, the fastener recesses 23 are dimensioned to maximize an engagement portion 36 of the mold sheet 12, the engagement portion 36 ultimately engaging the top edge portion 24 of the cabinet 14 and the bottom edge portion 26 of the countertop substrate 28, thereby maintaining the configuration of the mold sheet 12 when a countertop forming material 16 is disposed upon the reusable countertop mold 10.

The reusable countertop mold 10 further includes at least one stopper member 38 secured to a bottom wall 40 of the base portion 20. The stopper member 38 limits the horizontal distance of insertion of sheet mold between the bottom edge portion 26 of the countertop substrate 28 and the top edge portion 24 of the cabinet 14. The horizontal insertion distance is determined when the stopper members 38 engage a side wall portion 42 of the cabinet 14. The engagement portion 36 of the base portion 18 of the reusable countertop mold 10 includes a frictionless coating or a deformable film on both sides for reducing friction between the engagement portion 36 and the countertop substrate 28 and cabinet 14 when the engagement portion 36 is initially inserted between and ultimately removed from the countertop substrate 28 and cabinet 14 after a countertop forming material 16 engaging the mold 10 has become rigid.

The reusable countertop mold 10 also includes pullout tabs 44 secured to the bottom wall 40 of the mold sheet 12. The pullout tabs 44 are disposed such that sufficient space is provided between the side wall 42 of the cabinet 14 and the pullout tabs 44 after the stopper members 38 engage the side wall 42 of the cabinet 14. The provided sufficient space enables a person to grasp the pullout tabs 44, whereby, the mold sheet 12 is manually urged from an inserted position between the bottom edge portion 26 of the countertop substrate 28 and the top edge portion 24 of the cabinet 14 via a person grasping the pullout tabs 44 and slidably removing the engagement portions 36 of the base portion 18 of the mold sheet 12 from an inserted position after the countertop forming material 16 has hardened, thereby allowing the reusable countertop mold 10 to be reused for another countertop forming project. If a relatively large gap is formed via the removal of the engagement portions 36, shims can be used to replace the engagement portions 36 of the base portion 18 as the engagement portions 36 are slidably removed from between the countertop substrate 28 and the cabinet 14, thereby supporting and maintaining the position of the countertop substrate 28 relative to the cabinet 14.

The method for reusing a countertop mold includes the steps of:

determining the configuration and dimensions for a predetermined countertop 16 to be formed upon a preselected cabinet 14;

determining the configuration and dimensions for a countertop substrate 28 to be disposed upon the preselected cabinet 14, the countertop substrate 28 ultimately receives a countertop forming material 16 that ultimately "sets up" or otherwise hardens to form a substantially horizontal top wall 48;

providing relatively mold sheets 12 dimensioned and configured to ultimately form the predetermined countertop 16. The mold sheets have a relatively thin base portion 18 that promotes a substantially horizontal insertion of the base portion 18 of the mold sheet 12 between a top edge portion 24 of the cabinet 14 and a bottom edge portion 26 of the countertop substrate 28. The mold sheet 12 includes a wall portion 20 integrally joined to the base portion 18 such that the wall portion 20 is perpendicular to the base portion 18;

forming a plurality of fastener recesses 23 disposed at predetermined locations in an inner side portion 22 of the base portion 18 of sheet mold 12. The fastener recesses 23 promote the insertion of retaining screws 30 through the countertop substrate 28, through the fastener recesses 23 and into the top edge portion 24 of the cabinet 14 without the retaining screws 30 engaging the mold sheet 12, thereby allowing the mold sheet to be slidably removed from an inserted position between the bottom edge portion 26 of the countertop substrate 28 and the top edge portion 24 of the cabinet 14 after a countertop forming material 16 has been poured upon the countertop substrate 28. The countertop forming material 16 is retained upon the countertop substrate 28 by the base and wall portions 18 and 20. The periphery of the countertop substrate 28 ultimately receives a plurality of the mold sheets 12 such that a peripheral vertical wall is formed about the periphery of the countertop substrate 28 to maintain the countertop forming material 16 upon the countertop substrate 28 and to extend the countertop forming material 16 a preselected distance past the countertop substrate edges 32, thereby maintaining the countertop forming material 16 in a fixed position until hardening to form a predetermined countertop configuration 16 upon and about a vertical side wall or edge 32 of the countertop substrate 28;

marking guide lines 34 that identify centerlines for each fastener recess 23 thereby identifying the insertion point for a fastener retaining screw 30 relative to the fastener recesses 23 to secure the countertop substrate 28 to the cabinet 14 with the reusable countertop mold 10 inserted between the countertop substrate 28 and the cabinet 14, such that fastener recesses 23 are not visible to the user. The fastener recesses 23 are dimensioned to allow the fasteners 30 to avoid engagement with the mold sheet. Further, the fastener recesses 23 are dimensioned to maximize an engagement portion 36 of the mold sheet 12 that engages the top edge portion 24 of the cabinet 14 and the bottom edge portion 26 of the countertop substrate 28, thereby maintaining the configuration of the mold sheet 12 when a countertop forming material 16 is disposed upon the reusable countertop mold 10;

providing at least one stopper member 38 secured to a bottom wall 40 of the mold sheet 12. The stopper member 38 limits the horizontal distance of insertion of mold sheet 12 between the bottom edge portion 26 of the countertop substrate 28 and the top edge portion 24 of the cabinet 14. The horizontal insertion distance is determined when the stopper members 38 engage a side wall portion 42 of the cabinet 14; and providing pullout tabs 44 secured to the bottom wall 40 of the mold sheet 12. The pullout tabs 44 are disposed such that sufficient space is provided between the side wall 42 of the cabinet 14 and the pullout tabs 44 after the stopper member 38 engages the side wall portion 42 of the cabinet 14. The provided sufficient space enables a person to grasp the pullout tabs 44, whereby, the mold sheet 12 is manually urged from an inserted position between the bottom edge portion 26 of the countertop substrate 28 and the top edge portion 24 of the cabinet 14 via a person grasping the pullout tabs 44 and slidably removing the mold sheet from the inserted position after the countertop forming material 16 has hardened, thereby allowing the reusable countertop mold 10 to be reused for another countertop forming project.

In the event that overlapped end portion of molds 10 positioned "side-by-side" leave ridges or "ghost lines," hand tools well known to those of ordinary skill in the art can be used to grind down the ridges until the desired smooth surface is achieved. Alternatively, the edges of adjacent molds 10 can be engagingly positioned between the countertop substrate 28 and the cabinet 14; whereupon, duct tape or similar binding material can be used to maintain the positions of the adjacently disposed molds 10. Although the formation of ghost lines is reduced or eliminated, the time to assemble multiple molds edge to edge, secure adjacent molds 10 together, and remove the molds after the countertop forming material 16 has hardened, is more expensive to achieve then grinding down ridges formed from overlapping end portions of adjacent molds 10.

Referring now to FIGS. 5-7, an alternative configuration for the mold depicted in FIGS. 1-4 is illustrated. The alternative mold configuration is denoted as numeral 60 and includes a mold 60 having a stopper member 62 and pullout tabs 64 with different configurations and positions when compared to the same stopper members 38 and pullout tabs 44, respectively, for the reusable counter top mold 10 of FIGS. 1-4. The configuration and position of the stopper member 62 promotes more stability for the mold 60 when inserted between the top edge portion 24 of the floor mounted cabinet 14 and the countertop substrate 28. The configuration and position of the pullout tabs 64 enables a person to improve his or her grip on the mold 60 when removing the mold 60 from between the top edge portion 24 and the countertop substrate 28 after the countertop forming material 16 has solidified.

Referring now to FIGS. 8-10, an alternative configuration for the mold depicted in FIGS. 5-7 is illustrated. The alternative mold configuration is denoted as numeral 70 and includes a mold 70 having the pullout tabs 72 horizontally positioned and secured to an outer wall 74 proximate to the base portion 18 of the mold 70. Positioning the pullout tabs 72 in a horizontal position adjacent to the base portion 18 decrease the quantity of force required by a person to exert when extracting the mold 70 from an insertion position between the top edge portion 24 of the floor mounted cabinet 14 and the countertop substrate 18 after the countertop forming material 16 has hardened.

Figure 12:
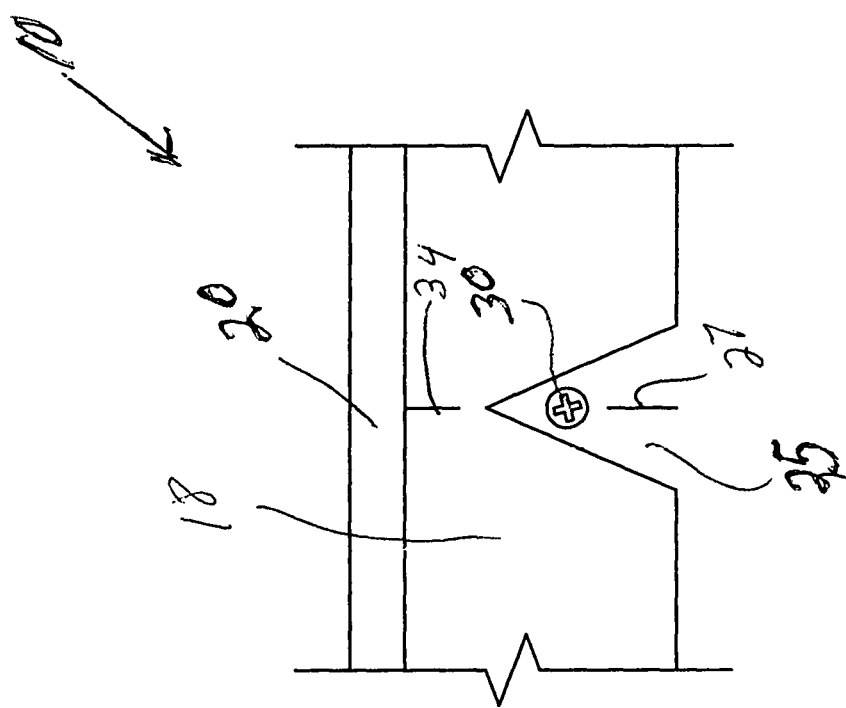
FIG. 12 is a top sectional view of the mold of FIG. 11, but with the recess having a "V" configuration in accordance with the present invention.

Referring now to FIGS. 11 and 12, FIG. 11 depicts a top sectional view of the mold 10 of FIG. 1 having a relatively "U" configured recess 23 in the base portion 18. FIG. 12 depicts a mold 10 having the same base portion 18, but with a relatively "V" configured fastener recess 25 in the base portion 18. The "V" configuration provides more stability to the base portion 18 when forcibly inserting the base portion 18 between the top edge portion 24 of the floor mounted cabinet 14 and the countertop substrate 18. The "V" configured recesses 25 disposed at predetermined locations in the inner side portion 22 of said base portion 18 of the mold sheet 12 promote the insertion of retaining screws 30 through the countertop substrate 28 and through the fastener recesses 25 in the base portion 18 of mold sheet 12, which has been inserted between the top edge portion 24 of the cabinet 14 and between the bottom edge portion 26 of the countertop substrate 28. The insertion of the retaining screws 30 continues through fastener recesses 25 and into the top edge portion 24 of the cabinet 14, without the retaining screws 30 engaging the mold sheet 12, thereby allowing the mold sheet 12 to be slidably removed from an inserted position between the bottom edge portion 26 of the countertop substrate 28 and the top edge portion 24 of the cabinet 14 after a countertop forming material 16 has been poured and hardened upon the countertop substrate 28

Referring now to FIGS. 13 and 13A-13C, a modified reusable countertop mold 80 having an alternative configuration for the mold depicted in FIG. 10 is depicted in accordance with the present invention. The modified mold 80 enables an edge portion 92 of a countertop 16 to extend vertically lower than a top edge portion 24 of the floor mounted cabinet 14. The mold 80 includes a cabinet portion 82 integrally secured to a countertop portion 84 such that the cabinet portion 82 replaces the stopper members 28 and inserts between the countertop substrate 28 and the cabinet 14 a distance that does not engage the retaining screws 30 (inserted through the countertop substrate 28 and into the top edge portion 24 of the floor mounted cabinet 14), thereby eliminating the need for the recesses 23 and allowing the modified reusable countertop mold 80 to be slid or otherwise pulled (via vertical cabinet portion pullout tabs 73 integrally secured to a vertical edge portion of the cabinet portion 82) in a direction parallel to a side wall 42 of the cabinet 14. The modified mold 80 further includes a countertop edge forming member 86 disposed on a base portion 88 of the countertop portion 84. In the event that the mold 80 includes a cabinet portion 82 that inserts between the countertop substrate 28 and cabinet 14 a distance that does engage the retaining screws 30, recesses 23 and guide lines 34 that identify centerlines 21 for each fastener recess 23 can be used to enable sufficient insertion of the cabinet portion 82 between the countertop substrate 28 and the cabinet 14.

The countertop edge forming member 86 is fabricated from plastic, polyurethane, Styrofoam, or similar Polystyrene materials. The edge forming member 86 includes a top wall 87 having a horizontal dimension corresponding to a predetermined distance of separation between the side wall 42 of the cabinet 14 and an inner wall 91 of a countertop edge portion 92. The countertop edge forming member 86 further includes a side wall 89 having a vertical dimension equal to the vertical dimension of the inner wall 91 of the countertop edge portion 92. The dimensions of the top and side walls 87 and 89 of the edge forming member 86 and the dimensions of the cabinet and countertop portions 82 and 84 cooperating to form a recess between the side wall 89 of the edge forming member 86 and an inner side all 95 of the side wall portion 90 of the countertop portion 84. The formed recess is ultimately filed with countertop forming material 16 that results in an edge portion 92 for the hardened countertop 16.

Figure 13:
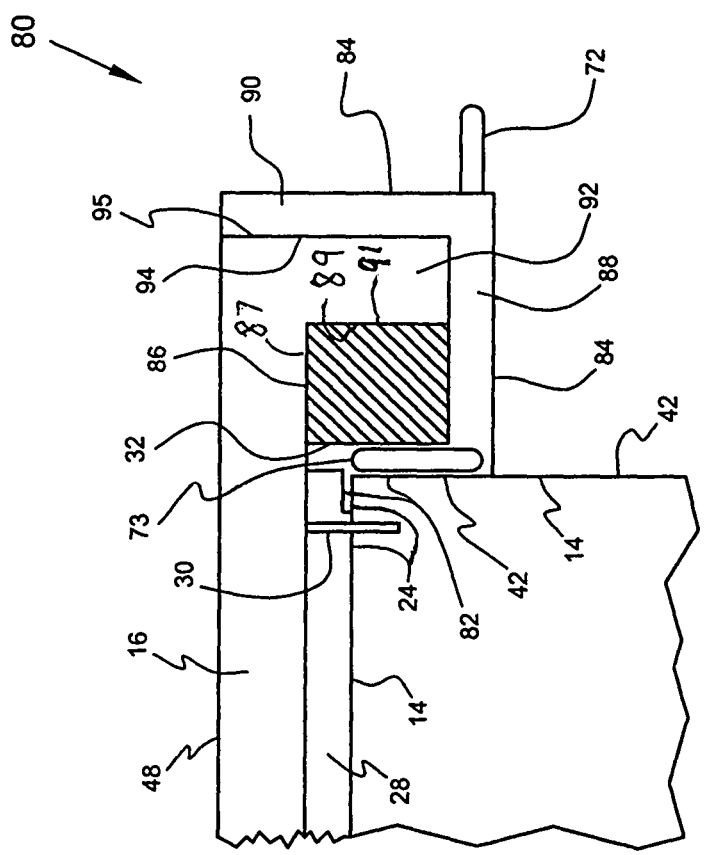
FIG. 13 is a cutaway side view of mold having an alternative configuration for the mold depicted in FIG. 10 in accordance with the present invention.

FIGS. 13A and 13C are front and top views of FIG. 13 separated from the edge portion 92. FIG. 13 B depicts the resulting edge portion 92 after the modified mold 80 and polyurethane countertop forming member 86 are removed from the resulting edge portion 92 of the countertop 16. The resulting countertop edge portion 92 is horizontally offset from and vertically extending below the countertop substrate 28, thereby providing a more artistic countertop. It is preferred that the edge forming member 86 be forcibly removed in a generally downward direction from the hardened countertop 16, after the modified mold 80 has been removed from between the substrate 28 and cabinet 14 by forcibly sliding the mold 80 parallel to the side wall portion 42 of the cabinet 14. Alternatively, the edge forming member 86 can be left in place to "fortify" the countertop edge portion 92 without the member 86 being visible.

Figure 14:
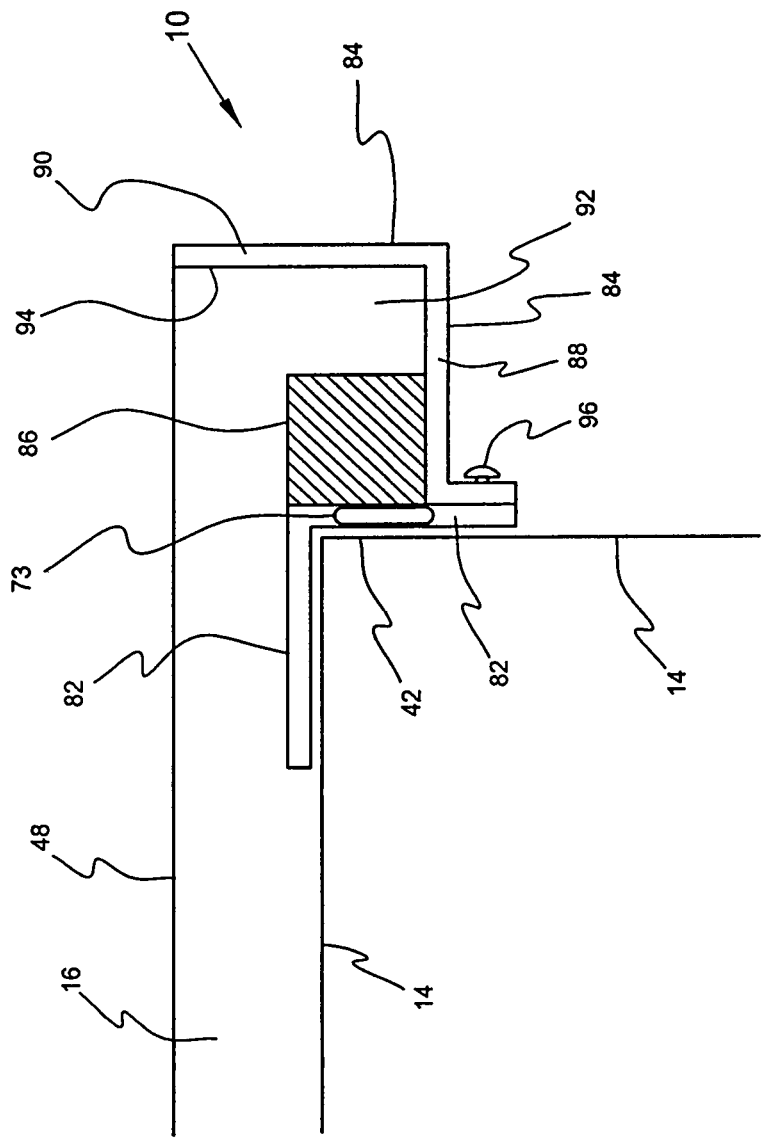
FIG. 14 is a side view of the mold depicted in FIG. 13, but with a fastener securing the cabinet portion to the countertop portion.

Referring now to FIG. 14, a side view of the modified mold 80 in FIG. 13 is illustrated without the pullout tabs 72, but with pullout tabs 73 integrally joined to the vertical portion of the cabinet portion 82 of the mold 80. FIG. 14 further includes the detachable joining of the base portion 88 of the countertop portion 84 to the vertical portion of the cabinet portion 82 via fastener 96. The fastener 96 is inserted through an aperture (not depicted) in a vertically descending portion of the base portion 88 of the countertop portion 84. The fastener 96 is rotationally inserted into and received by a threaded aperture in the vertical portion of the cabinet portion 82, thereby allowing a user to adjust the vertical dimension of the vertical outer wall 94 of the edge portion 92 of the countertop forming material 16 by replacing the countertop portion 84 with a selected countertop portion having a vertically descending portion of the base portion 88 with a different longitudinal dimension.

Alternatively, the fastener 96 is inserted through a vertically disposed slot (not depicted) in a vertically descending portion of the base portion 88 of the countertop portion 84. The fastener 96 is rotationally inserted into and received by a threaded aperture in the vertical portion of the cabinet portion 82, thereby allowing a user to adjust the vertical dimension of the outer wall 94 of the edge portion 92 of the countertop forming material 16 by slightly extracting the fastener 96 from the vertical portion of the cabinet portion 82 and vertically repositioning the vertically descending portion of the base portion 88 of the countertop portion 84 upon the vertical portion of the cabinet portion 82. The fastener 96 is then re-inserted and tightened into the threaded aperture in the vertical portion of the cabinet portion 82, resulting in a secured and repositioned base portion 88 relative to the cabinet portion 82, and a corresponding vertical dimension for the vertical outer wall 94 of the edge portion 92 of the hardened countertop 16.

The modified mold 80 of FIG. 14 is adjustable such that the vertical elevation of the countertop forming material 16 above the countertop substrate 28 is adjusted by varying the vertical dimension of a side wall portion 90 of the countertop portion 84. The inclusion of the fastener 96 enables the countertop portion 84 to be removed (after the countertop forming material 16 has hardened) by removing the fastener 96; whereupon, the countertop portion 84 is separated from the cabinet portion 82 and the countertop forming member 86 is forcibly and manually lowered and removed from the hardened countertop forming material 16.

The horizontal portion of the cabinet portion 82 of the mold 80 is manually extracted from between the substrate 28 and the cabinet 14 by perpendicularly urging the vertical portion of the cabinet portion 82 from the side wall 42 of the cabinet 14 via the pullout tabs 73 until the cabinet portion 82 is separated from both the countertop substrate 28 and the cabinet 14, thereby positioning the cabinet portion 82 in a recess formed by the removal of the countertop forming member 86. The cabinet portion 82 is then lowered and removed from the edge portion 92 of the hardened countertop forming material 16. The cabinet portion 82 and countertop portion 84 are again secured together by the fastener 96 to enable the resulting mold 80 to be reused on another project. It is preferred that the edge forming member 86 be forcibly removed in a generally downward direction from the hardened countertop 16, after the modified mold 80 has been removed from between the substrate 28 and cabinet 14 by forcibly sliding the mold 80 parallel to the side wall portion 42 of the cabinet 14. Alternatively, the edge forming member 86 can be left in place to "fortify" the countertop edge portion 92 without the member 86 being visible.

Figure 15:
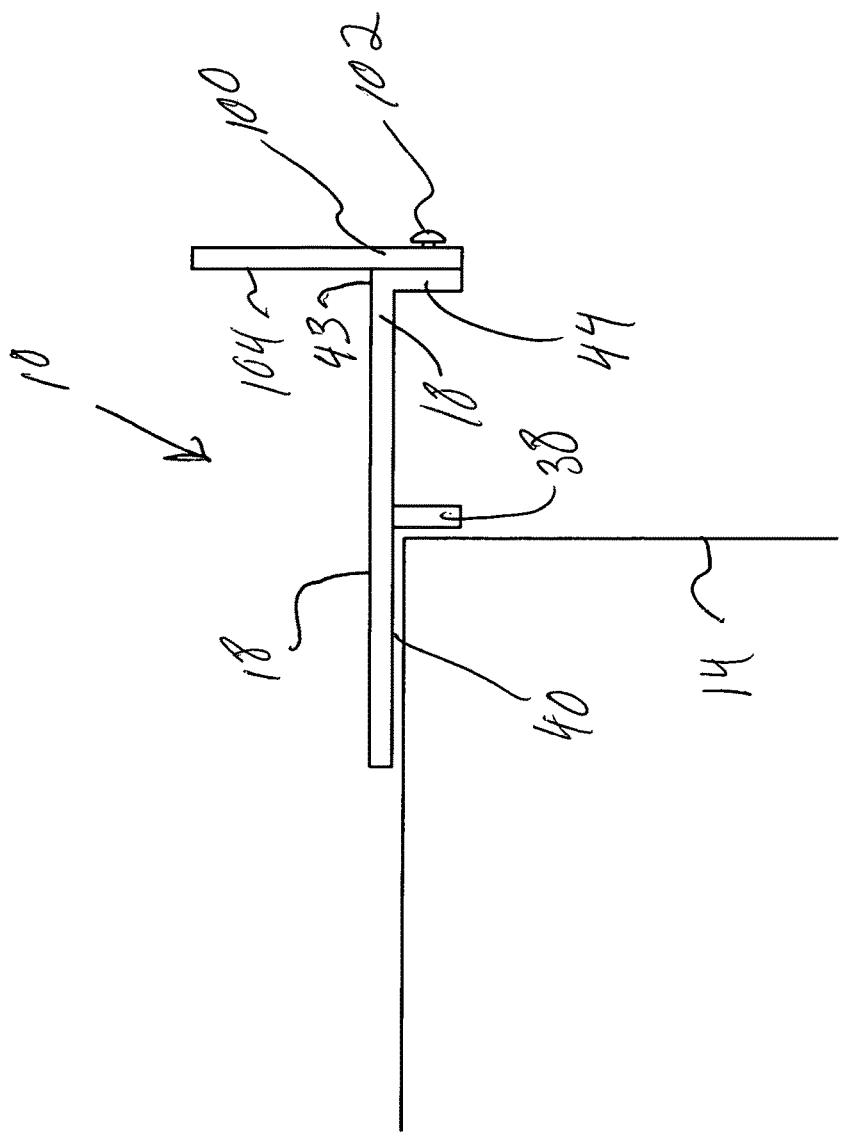
FIG. 15 is a side view of the mold depicted in FIG. 3, but with a wall portion detachably secured to the pullout tabs of the base portion.
Figure 16:
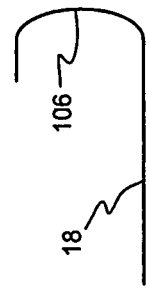
FIG. 16 is a side view of the mold depicted in FIG. 3, but with the wall portion having an arcuate configuration.
Figure 17:
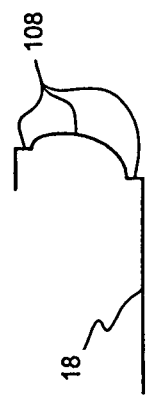
FIG. 17 is a side view of the mold depicted in FIG. 3, but with the wall portion having both lineal and arcuate configurations.
Figure 18:
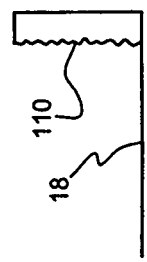
FIG. 18 is a side view of the mold depicted in FIG. 3, but with the wall portion having a rough or granular side wall.

Referring now to FIG. 15, a side view of the mold 10 in FIG. 3 is illustrated, but with a fastener 102 detachably securing a wall portion 100 to the pullout tabs 44 integrally joined to an outer end 43 the base portion 18. Detachably securing the wall portion 100 to the pullout tabs 44 enables a user of the mold 10 to vary a wall portion 100 and correspondingly vary the vertical dimension and a predetermined wall surface 104 configuration that engages the countertop forming material 16. After the material 16 hardens, the configuration of the wall surface 104 is transferred to the vertical wall 94 (see FIG. 13B) of the edge portion 92 of the material 16. This feature enables a person using the mold 10 to select one of a myriad of possible wall surfaces 104 to configure the vertical wall 94 of the countertop forming material 16 extending past the side wall portion 42 of the cabinet 14. For example, the wall surface 104 can have an arcuate configuration 106 (see FIG. 16), a combination arcuate-lineal configuration (see FIG. 17), or a rough or granular configuration (see FIG. 18).

The foregoing description is for purpose of illustration only and is not intended to limit the scope of protection accorded this invention. The scope of protection is to be measured by the following claims, which should be interpreted as broadly as the inventive contribution permits.

The invention claimed is:

1. A reusable countertop mold comprising:
   at least one mold sheet dimensioned and configured to ultimately form a countertop having a predetermined configuration with predetermined dimensions, said mold sheet having a base portion with an edge portion that promotes a substantially horizontal insertion of said base portion of said mold sheet between a top edge portion of a cabinet and a bottom edge portion of a countertop substrate, said mold sheet including a wall portion integrally joined to an edge of said base portion such that said wall portion is perpendicular to said base portion;
   a plurality of fastener recesses disposed at predetermined locations in a side portion of said base portion of said mold, said fastener recesses promoting the insertion of retaining screws through the countertop substrate, through said fastener recesses and into said top edge portion of the cabinet without the retaining screws engaging said mold sheet, thereby allowing said mold sheet to be slidably removed from an inserted position between the bottom edge portion of the countertop substrate and the top edge portion of the cabinet after a countertop forming material has been poured upon the countertop substrate, the countertop forming material being retained upon the countertop substrate by said wall portion joined to said mold sheet opposite said fastener recesses, the periphery of the countertop substrate ultimately receiving a plurality of said mold sheets such that a peripheral vertical wall is formed about the periphery of the countertop substrate to maintain the countertop forming material upon the countertop substrate and to extend the countertop forming material a preselected distance past the countertop substrate edges, thereby maintaining the countertop forming material in a fixed position until hardening to form a predetermined countertop configuration upon and about a vertical side wall of the countertop substrate;
   guide lines that identify centerlines for each fastener recess thereby identifying the insertion point for a fastener relative to said fastener recesses to secure the countertop substrate to the cabinet with said reusable countertop mold inserted between the countertop substrate and the cabinet when said fastener recesses are not visible to the user, said fastener recesses being dimensioned to allow the fasteners to avoid engagement with said relatively rigid sheet, and said fastener recesses being dimensioned to maximize an engagement portion of said relatively rigid sheet that engages the top edge portion of the cabinet and the bottom edge portion of the countertop substrate, thereby maintaining the configuration of said relatively rigid sheet when a countertop forming material is disposed upon the reusable countertop mold;
   at least one stopper member secured to a bottom wall of said mold sheet, said stopper member limiting the horizontal distance of insertion of said mold sheet between the bottom edge portion of the countertop substrate and the top edge portion of the cabinet, the horizontal insertion distance being determined prior to the selection of said reusable countertop mold; and
   pullout tabs secured to said bottom wall of said mold sheet, said pullout tabs being disposed a predetermined distance from said at least one stopper member when said at least one stopper member engages the side wall of the cabinet, said predetermined distance enabling a person to grasp said pullout tabs; whereby, said mold sheet is manually extracted from an inserted position between the bottom edge portion of the countertop substrate and the top edge portion of the cabinet via a person grasping said pullout tabs and slidably removing said mold sheet from said inserted position after the countertop forming material has hardened, thereby allowing said reusable countertop mold to be reused for another countertop forming project.

2. The reusable countertop mold of claim 1 wherein said base portion of said mold sheet includes a deformable film for reducing friction between said base portion and the countertop substrate and cabinet when said base portion is initially inserted between and ultimately removed from the countertop substrate and cabinet after a countertop forming material disposed in said mold has become rigid.

3. The reusable countertop mold of claim 1 wherein said mold sheet includes a thickness dimension that promotes flexibility and minimizes the gap between the top edge portion of the countertop substrate and the bottom edge portion of the countertop substrate.

4. The reusable countertop mold of claim 1 wherein said plurality of fastener recesses in said side portion of said mold sheet includes a substantially "U" shaped configuration having a lateral dimension greater than the diameter of the shank of fasteners inserted through the recesses when securing the countertop substrate to the cabinet, thereby increasing the rigidity of the mold sheet and correspondingly maintaining the configuration of said reusable countertop mold when the countertop forming material is disposed upon said mold.

5. The reusable countertop mold of claim 1 wherein said at least one stopper member is disposed such that said fastener recesses are completely inserted between the countertop substrate and the cabinet, thereby enabling said reusable countertop mold to receive the countertop forming material without any of the countertop forming material seeping through said fastener recesses.

6. The reusable countertop mold of claim 1 wherein shims are used to replace said base portion of said mold sheet after said base portion sheet has been slidably removed from between the countertop substrate and the cabinet, thereby supporting and maintaining the position of the countertop substrate relative to the cabinet.

* * * * *